United States Patent
Seong et al.

(10) Patent No.: US 10,086,671 B2
(45) Date of Patent: Oct. 2, 2018

(54) ELECTRONIC CONTROL SUSPENSION APPARATUS INCLUDING MULTISTEP SWITCH AND DAMPING FORCE CONTROLLING METHOD THEREOF

(71) Applicant: MANDO CORPORATION, Pyeongtaek-si, Gyeonggi-do (KR)

(72) Inventors: Min Sang Seong, Suwon-si (KR); Back Hyun Sung, Iksan-si (KR); Kyoung Won Park, Pyeongtaek-si (KR); Ki Haeng Cho, Iksan-si (KR); Ki Pal Ryu, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 14 days.

(21) Appl. No.: 15/163,599

(22) Filed: May 24, 2016

(65) Prior Publication Data

US 2016/0347142 A1    Dec. 1, 2016

(30) Foreign Application Priority Data

May 29, 2015 (KR) .......................... 10-2015-0076035

(51) Int. Cl.
| | |
|---|---|
| *B60G 17/015* | (2006.01) |
| *B60G 17/018* | (2006.01) |
| *B60G 17/0195* | (2006.01) |
| *B60W 10/22* | (2006.01) |

(52) U.S. Cl.
CPC ....... *B60G 17/018* (2013.01); *B60G 17/0195* (2013.01); *B60W 10/22* (2013.01); *B60G 2204/62* (2013.01); *B60G 2500/102* (2013.01); *B60G 2600/20* (2013.01); *B60G 2800/16* (2013.01)

(58) Field of Classification Search
CPC .............. B60G 17/015; B60G 17/0152; B60G 17/016; B60G 17/0195
See application file for complete search history.

(56) References Cited

U.S. PATENT DOCUMENTS

| | | | | |
|---|---|---|---|---|
| 4,555,126 | A * | 11/1985 | Ishimitsu ........... | B60G 17/0162 280/5.504 |
| 9,694,639 | B2 * | 7/2017 | Near ........................ | H02K 5/12 |
| 2002/0103587 | A1 * | 8/2002 | Kim ..................... | B60G 17/016 701/37 |

(Continued)

*Primary Examiner* — Kimberly S Berona
*Assistant Examiner* — Anshul Sood
(74) *Attorney, Agent, or Firm* — McDermott Will & Emery LLP

(57) ABSTRACT

Provided are an electronic control suspension apparatus and a damping force controlling method thereof, which are capable of changing a damping force of a damper by just manipulating a multistep switch even during driving. The electronic control suspension apparatus for controlling a damping force of a damper installed at each of a front wheel and a rear wheel includes: a multistep switch disposed in a vehicle and configured to change the damping force of the damper in a multistep manner between a hard step and a soft step; and an electronic control unit configured to control the damping force of the damper according to a current amount corresponding to a step selected from the multistep switch, the current amount to be applied to a solenoid valve being preset for each step of the multistep switch.

12 Claims, 2 Drawing Sheets

(56) References Cited

U.S. PATENT DOCUMENTS

| | | | |
|---|---|---|---|
| 2003/0121737 A1* | 7/2003 | Koh | B60G 17/019 188/266.1 |
| 2010/0076649 A1* | 3/2010 | Iyoda | B60G 17/0162 701/38 |
| 2010/0191420 A1* | 7/2010 | Honma | B60G 17/0162 701/38 |
| 2015/0057885 A1* | 2/2015 | Brady | B60G 17/06 701/38 |

* cited by examiner

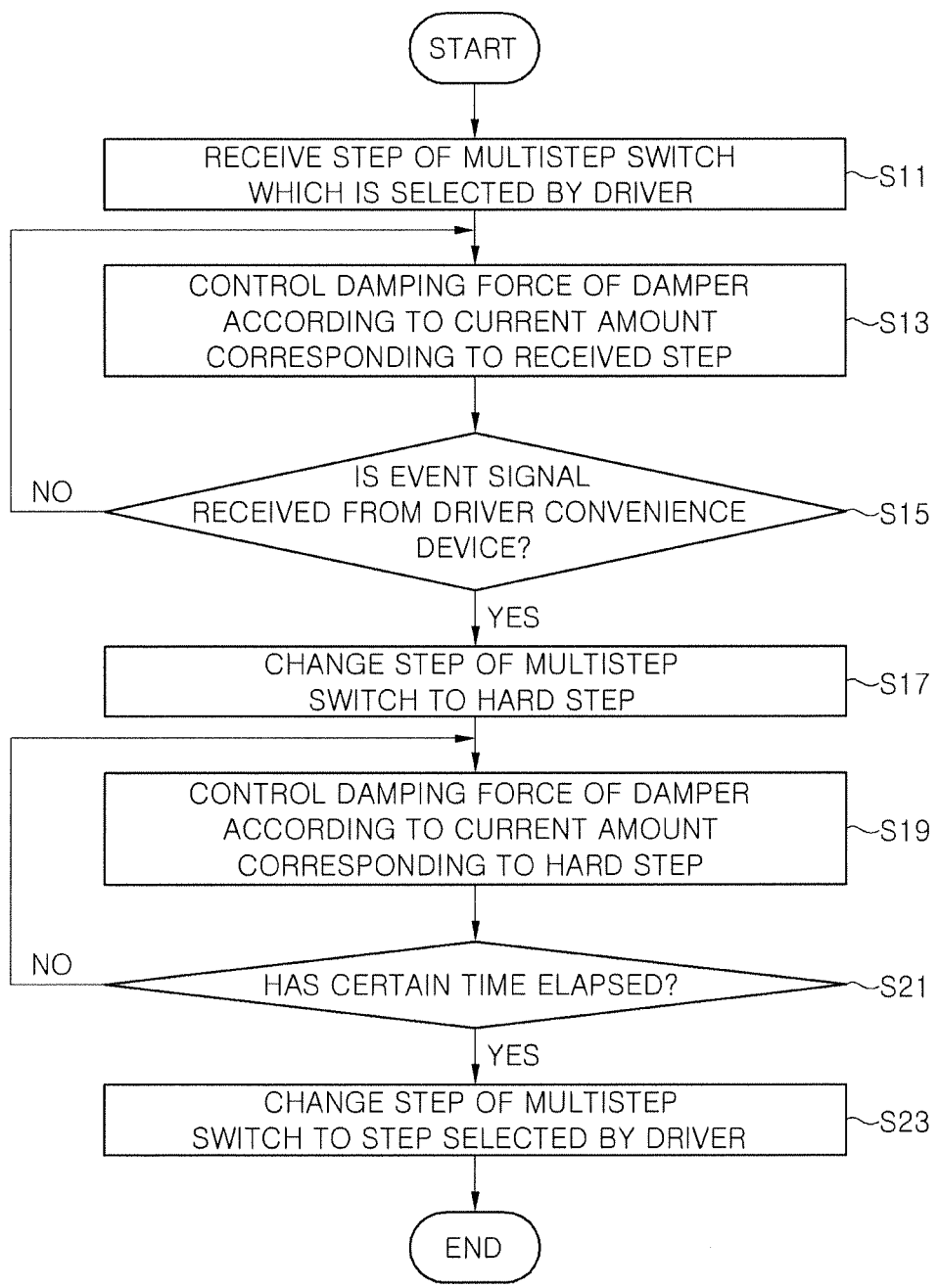

US 10,086,671 B2

ELECTRONIC CONTROL SUSPENSION APPARATUS INCLUDING MULTISTEP SWITCH AND DAMPING FORCE CONTROLLING METHOD THEREOF

CROSS-REFERENCE(S) TO RELATED APPLICATION

This application claims the benefit of Korean Patent Application No. 10-2015-0076035, filed on May 29, 2015, in the Korean Intellectual Property Office, the disclosure of which is incorporated herein in its entirety by reference.

BACKGROUND OF THE INVENTION

Field of the Invention

The present invention relates to an electronic control suspension apparatus including a multistep switch and a damping force controlling method thereof, and more particularly, to an electronic control suspension apparatus and a damping force controlling method thereof, which are capable of changing a damping force of a damper by just manipulating a multistep switch during driving.

Description of the Related Art

Generally, an electronic control suspension apparatus is a shock absorption apparatus including a shock absorber or a spring between a vehicle shaft and a vehicle frame. The electronic control suspension apparatus functions to alleviate a vertical vibration of a vehicle and alleviate a shock and a vibration applied from a road surface to thereby prevent the shock and the vibration from being transferred to a vehicle body.

An electronic control suspension apparatus for improving driving stability and ride comfort is disclosed in Korean Patent Application Laid-Open No. 10-1998-017112 and the like.

Existing electronic control suspension apparatuses, which are disclosed in Korean Patent Application Laid-Open No. 10-1998-017112 and the like, require various types of sensors, for example, two wheel-G sensors and three body-G sensors, so as to perform a continuous damping force control according to a behavior of a vehicle body. The various types of sensors need a complex installation work such as wiring connection and increase costs of a vehicle.

Therefore, there is a need for an improved electronic control suspension apparatus which is capable of preventing an increase in costs of a vehicle by eliminating sensors used for controlling a damping force of a damper and is capable of changing a damping force of a damper to a state desired by a driver.

When the damping force of the damper is soft, ride comfort is improved, but driving stability is deteriorated. When the damping force of the damper is hard, ride comfort is deteriorated, but driving stability is improved.

When a vehicle is driven in a soft mode for improved ride comfort according to a driver's tendency, an existing electronic control suspension apparatus has a limitation in that driving stability is deteriorated due to the priority of the ride comfort even when a vehicle is in an emergency state or an abnormal driving state.

In particular, an existing electronic control suspension apparatus allows a driver to change a damping force of a damper by changing a step of a damping force change knob with steps 1 to 10 disposed under a damper according to a driver's intention. However, in the existing electronic control suspension apparatus, it is impossible to change the step of the damping force change knob during driving, and it is necessary make a lot of effort because a vehicle needs to be placed on a maintenance lift so as to change the damping force.

PRIOR ART DOCUMENT(S)

Patent Document (Patent Document 1) Korea Patent Application Laid-Open No. 10-1998-017112 (Jun. 5, 1998) entitled "ELECTRONIC CONTROL SUSPENSION APPARATUS AND METHOD OF CONTROLLING DAMPING FORCE THEREOF"

SUMMARY OF THE INVENTION

An aspect of the present invention is directed to provide an electronic control suspension apparatus and a damping force controlling method thereof, which are capable of changing a damping force of a damper by just manipulating a multistep switch even during driving.

Another aspect of the present invention is directed to provide an electronic control suspension apparatus and a damping force controlling method thereof, which are capable of optimizing handling performance and ride comfort of a driver in such a manner that, when an event signal is received from a driver convenience device installed in a vehicle, a step of a multistep switch is changed to adjust a damping force of a damper to be hard, and after a certain time has elapsed, the step of the multistep switch is automatically changed to a step selected by the driver.

According to an embodiment of the present invention, there is provided an electronic control suspension apparatus for controlling a damping force of a damper installed at each of a front wheel and a rear wheel, the electronic control suspension apparatus including: a multistep switch disposed in a vehicle and configured to change the damping force of the damper in a multistep manner between a hard step and a soft step; and an electronic control unit configured to control the damping force of the damper according to a current amount corresponding to a step selected from the multistep switch, the current amount to be applied to a solenoid valve being preset for each step of the multistep switch.

The electronic control unit may store a step of the multistep switch which is selected by a driver, and when an event signal is received from a driver convenience device installed in the vehicle, the electronic control unit may change the step of the multistep switch such that the damping force of the damper is adjusted to be hard.

The step of the multistep switch may be divided into a hard step of prioritizing driving stability and a soft step of prioritizing ride comfort, and the soft step may be subdivided into at least two sub-steps.

When the event signal is received, the electronic control unit may control the damping force of the damper by changing the step of the multistep switch to the hard step and applying a current amount corresponding to the hard step to the solenoid valve.

When a certain time has elapsed after the change of the step of the multistep switch to the hard step, the electronic control unit may change the hard step to the step selected by the driver.

The electronic control suspension apparatus may further include an interface unit configured to receive vehicle behavior information including information about at least one of a steering angle, a vehicle speed, a brake pedal pressure, and an acceleration pedal, and transmit the received vehicle behavior information to the electronic control unit, wherein the electronic control unit includes the vehicle behavior information received by the interface unit with preset reference behavior information and changes the step of the multistep switch based on the comparison result.

The driver convenience device may include a device installed in the vehicle for driving stability of the vehicle and driving convenience of the driver.

The driver convenience device may include at least one selected from a traction control system (TCS), a vehicle dynamic control (VDC), an autonomous emergency braking (AEB), a lane keeping system (LKS), an adaptive cruise control (ACC), a tire pressure monitoring system (TPMS), a motor-driven power steering (MDPS), a blind spot detection (BSD), a traffic jam assist (TJA), and a lane change assistant system (LCA).

When a fail signal is received from a driver convenience device, the electronic control unit may change the step of the multistep switch such that the damping force of the damper is adjusted to be hard.

When a certain time has elapsed after the change of the step of the multistep switch to the hard step, the electronic control unit may sequentially change the step of the multistep switch from the hard step to the step selected by the driver.

According to another embodiment of the present invention, there is provided a damping force controlling method of an electronic control suspension apparatus for controlling a damping force of a damper installed at each of a front wheel and a rear wheel, the damping force controlling method including: receiving a step selected from a multistep switch disposed in a vehicle; and controlling the damping force of the damper by determining a current amount corresponding to the received step by referring to a storage unit that stores a current amount to be applied to a solenoid valve for each step of the multistep switch.

The receiving of the step may include further receiving an event signal from a driver convenience device installed in the vehicle or further receiving vehicle behavior information including information about at least one of a steering angle, a vehicle speed, a brake pedal pressure, and an acceleration pedal.

The damping force controlling method may further include, after the receiving of the step, storing the step selected from the multistep switch, wherein, when the event signal is received from the driver convenience device installed in the vehicle, the controlling of the damping force includes changing the step of the multistep switch to a hard step of prioritizing steering stability such that the damping force of the damper is adjusted to be hard.

The controlling of the damping force may include: determining whether a certain time has elapsed after changing the step of the multistep switch; and when it is determined that the certain time has elapsed, changing the hard step to the step of the multistep switch which is stored in the storing of the step.

When a fail signal is received from a driver convenience device, the controlling of the damping force may include changing the step of the multistep switch such that the damping force of the damper is adjusted to be hard.

When a certain time has elapsed after changing the step of the multistep switch to the hard step of prioritizing driving stability, the controlling of the damping force may include sequentially changing the step of the multistep switch from the hard step to the step of the multistep switch which is stored in the storing of the step.

BRIEF DESCRIPTION OF THE DRAWINGS

FIG. 2 is a flowchart of a damping force controlling method of an electronic control suspension apparatus including a multistep switch, according to an embodiment of the present invention.

DETAILED DESCRIPTION OF EMBODIMENTS

Figure 1:
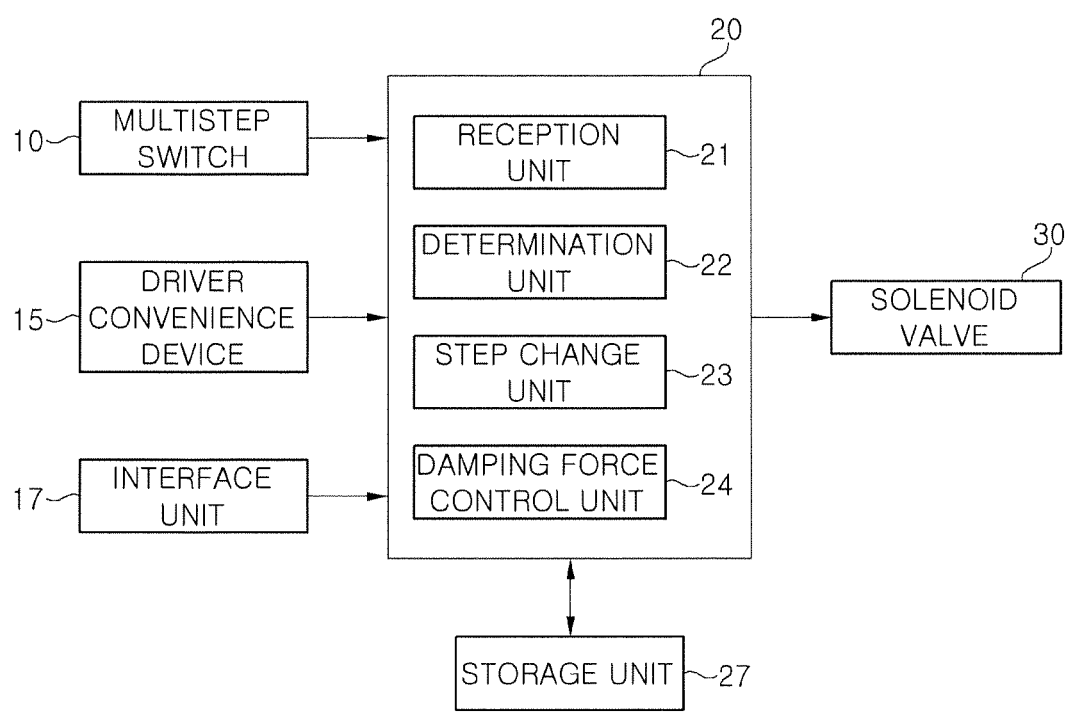
FIG. 1 is a block diagram of an electronic control suspension apparatus including a multistep switch, according to an embodiment of the present invention.

Hereinafter, preferred embodiments of the present invention will be described in detail with reference to the accompanying drawings.

FIG. 1 is a block diagram of an electronic control suspension apparatus according to an embodiment of the present invention.

Referring to FIG. 1, the electronic control suspension apparatus according to the embodiment of the present invention may include a multistep switch 10 that is disposed in a vehicle, an electronic control unit 20 that controls a damping force of a damper according to a step selected from the multistep switch 10 even during driving, and a solenoid valve 30 that is installed at a damper of a vehicle wheel and controls the damping force of the damper under control of the electronic control unit 20.

The multistep switch 10 may be installed around a driver. A step of the multistep switch 10 may be divided into a hard step of prioritizing driving stability and a soft step of prioritizing ride comfort. The soft step may be further subdivided. That is, the soft step may be subdivided into at least two sub-steps by subdividing a current amount. The step of the multistep switch 10 may be subdivided based on a current amount to be applied to the solenoid valve 30.

The electronic control unit 20 may control the damping force of the damper according to the step selected from the multistep switch 10. The current amount to be applied to the solenoid valve 30 may be stored in a storage unit 27 for each step of the multistep switch 10. The current amount preset for each step may be determined by experience.

In addition, when an event signal is received from a driver convenience device 15 for driving convenience of a driver while the damping force of the damper is controlled to a step of the multistep switch 10 which is selected by the driver, the electronic control unit 20 instantaneously changes the step selected by the driver to the hard step of prioritizing driving stability. When a certain time has elapsed after the step selected by the driver is changed to the hard step, the electronic control unit 20 automatically changes the hard step to the step selected by the driver.

The driver convenience device 15 may include a traction control system (TCS), a vehicle dynamic control (VDC), an autonomous emergency braking (AEB), a lane keeping system (LKS), and the like. In addition, the driver convenience device 15 may include a device installed in a vehicle for driving convenience of a driver.

The event signal received from the driver convenience device 15 may include, for example, an emergency brake signal from the AEB. In addition to the emergency brake signal, the event signal may include an emergency signal or an abnormality notification signal, which notifies an emergency state or an abnormal driving state.

The case where the step selected by the driver is changed to the hard step when the event signal is received from the driver convenience device 15 has been described, but the present invention is not limited thereto. For example, it may be determined whether a vehicle is in an emergency state condition or an abnormal driving state condition (for example, quick acceleration, quick deceleration, or quick handling) by comparing preset reference behavior information with vehicle behavior information including information about at least one of a steering angle, a vehicle speed, a brake pedal pressure, and an acceleration pedal. When it is determined that the vehicle is in the emergency state condition or the abnormal driving state condition, the step selected by the driver may be instantaneously changed to the hard step such that the damping force of the damper is adjusted to be hard.

The electronic control unit 20 may include a reception unit 21, a determination unit 22, a step change unit 23, and a damping force control unit 24.

The reception unit 21 may receive a step of the multistep switch 10 which is selected by a driver.

The damping force control unit 24 may control the damping force of the damper based on the step of the multistep switch 10 which is received by the reception unit 21.

In addition, the reception unit 21 may receive an event signal generated by the driver convenience device 15. The reception unit 21 may receive vehicle behavior information, e.g., information about at least one of a steering angle, a brake pedal pressure, and an acceleration pedal, from a sensor installed in the vehicle through an interface unit 17.

The determination unit 22 may determine whether the vehicle behavior information from the sensor installed in the vehicle is greater than preset reference behavior information, that is, whether the vehicle is in the emergency state condition or the abnormal driving state condition.

When the event signal is received from the driver convenience device 15 while the damping force of the damper is controlled to the step of the multistep switch 10 which is selected by the driver, or when the determination unit 22 determines that the vehicle is in the emergency state condition or the abnormal driving state condition, the step change unit 23 may change the step of the multistep switch 10 such that the damping force of the damper is adjusted to be hard. At this time, the step of the multistep switch 10 is changed to the hard step of prioritizing driving stability. The case of changing the step of the multistep switch 10 has been described, but the present invention is not limited thereto. For example, the step change unit 23 may be implemented in a software manner such that the step of the multistep switch 10 is instantaneously changed to the hard step until before a certain time has elapsed, and then, the hard step is automatically changed to the step selected by the driver after the certain time has elapsed.

As described above, after the elapse of the certain time from the change of the step of the multistep switch 10 to the hard step, the step change unit 23 changes the hard step to the step of the multistep switch 10 which is selected by the driver. At this time, the step selected by the driver may be stored in the storage unit 27.

For example, in a case where the step of the multistep switch 10 is set to a soft step of prioritizing ride comfort by the driver, when the event signal is received from the driver convenience device 15 during driving, or when the vehicle is in the emergency state condition or the abnormal driving state condition, the soft step set by the driver may be instantaneously changed to the hard step, and after the elapse of a certain time from the change of the soft step to the hard step of prioritizing driving stability, the hard step may be changed again to the soft step of prioritizing ride comfort which is selected by the driver.

Therefore, even when the vehicle is driven at the soft step of prioritizing ride comfort according to a driver's tendency, handling performance may be instantaneously maximized when the vehicle is in an emergency state or an abnormal driving state.

The damping force control unit 24 may control the damping force of the damper by extracting a current amount corresponding to the step selected from the multistep switch 10 or the step changed by the step change unit 23 and applying the extracted current amount to the solenoid valve 30. At this time, the current amount to be applied to the solenoid valve 30 may be set for each step of the multistep switch 10 and may be stored in the storage unit 27 in association with each step of the multistep switch 10.

In the present embodiment, the step of the multistep switch 10 may be divided into step 1 (full hard step), step 2 (med-hard step), step 3 (medium step), step 4 (med-soft step), and step 5 (full soft step). Step 1 is the hard step, and steps 2 to 5 are the soft step. The soft step is subdivided into the four steps, but is not necessarily limited thereto.

Regarding the current amount set for each step of the multistep switch 10, for example, in the case of steps 1 to 5, current amounts applied to the solenoid valve 30 may be respectively set to 0.3 A, 0.7 A, 1.0 A, 1.3 A, and 1.6 A. The set current amounts may be stored in the storage unit 27. The above-described current amount for each step is merely an example, and the present invention is not limited thereto.

In addition, the damping force control unit 24 may individually control vehicle wheels and may integrally control a damping force according to a vehicle behavior at the time of quick turning, quick braking, or quick accelerating, and a damping force according to the step of the multistep switch 10, based on a determination result of a vehicle motion.

Hereinafter, a damping force controlling method of an electronic control suspension apparatus including a multistep switch, according to an embodiment of the present invention, will be described.

FIG. 2 is a flowchart of a damping force controlling method of the electronic control suspension apparatus including the multistep switch 10, according to an embodiment of the present invention.

Referring to FIG. 2, the electronic control unit 20 receives a step of the multistep switch 10 which is selected by a driver (S11). The multistep switch 10 may change a damping force of a damper from a hard step to a soft step, and may be installed around a driver in a vehicle such that the driver easily changes the step of the multistep switch 10 during driving.

The electronic control unit 20 controls the damping force of the damper by extracting, from the storage unit 27, a current amount corresponding to the step received by the reception unit 21 and applying the extracted current amount to the solenoid valve 30 (S13).

As described above, since the damping force of the damper is controlled according to the current amount set in association with the step selected from the multistep switch 10, the damping force of the damper may be easily changed to the step desired by the driver, either the soft step or the hard step, thereby achieving driver satisfaction. In addition, unlike the existing electronic control suspension apparatus requiring various types of sensors, for example, two wheel-G sensors and three body-G sensors, so as to perform a continuous damping force control according to a behavior of a vehicle body, the damping force can be controlled by the step selected from the multistep switch 10, thereby considerably reducing costs of a vehicle.

The electronic control unit 20 determines whether an event signal is received from a driver convenience device 15 (S15). Since the event signal has been described above, redundant descriptions thereof will be omitted.

As a determination result of operation S15, when the event signal is not received from the driver convenience device 15, the electronic control unit 20 returns the process to operation S13 described above. When the event signal is not received from the driver convenience device 15, the case where the damping force is controlled according to the current amount corresponding to the step selected from the multistep switch 10 by returning the process to operation S13 has been described above. However, the damping force controlling method of the electronic control suspension apparatus may further include determining whether the vehicle is in an emergency state or an abnormal driving state, based on vehicle behavior information including information about at least one of a steering angle, a vehicle speed, a brake pedal pressure, and an acceleration pedal. When the vehicle is not in the emergency state or is a normal driving state, the process returns to operation S13, but when the vehicle is in the emergency state or the abnormal driving state, the process proceeds to operation S17 to be described below.

As a determination result of operation S15, when the event signal is received from the driver convenience device 15, the electronic control unit 20 changes the step selected from the multistep switch 10 to the hard step (S17). The hard step means the step 1 of prioritizing driving stability as described above.

The electronic control unit 20 controls the damping force of the damper by applying, to the solenoid valve 30, a current amount, e.g., 0.3 A corresponding to the hard step (S19).

The electronic control unit 20 determines whether a certain time has elapsed after the change of the selected step to the hard step (S21).

As a determination result of operation S21, when the certain time has not elapsed after the change of the selected step to the hard step, the electronic control unit 20 returns the process to operation S19 to control the damping force of the damper according to the current amount corresponding to the hard step.

As a determination result of operation S21, when the certain time has elapsed after the change of the selected step to the hard step, the electronic control unit 20 performs control such that the hard step is automatically changed to the step selected by the driver (S23). The step selected by the driver may be stored in the storage unit 27. When the certain time has elapsed, the electronic control unit 20 may change the hard step to the step stored in the storage unit 27, i.e., the step of the multistep switch 10 which is selected by the driver by referring to the storage unit 27.

Therefore, in a case where a vehicle is driven by prioritizing ride comfort according to a driver's tendency, when the event signal is received from the driver convenience device 15 while the vehicle is driven at step 5, step 4, step 3, or step 2, the step may be instantaneously changed to step 1 of prioritizing driving stability, and after a certain time has elapsed, step 1 may be changed to a step selected by a driver, for example, step 5, thereby optimizing handling performance and ride comfort of the driver.

According to the embodiments of the present invention, the damping force of the damper may be changed by just manipulating the multistep switch even during driving.

In addition, according to the embodiments of the present invention, since the multistep switch is provided in the vehicle to change the damping force of the damper from the hard step to the soft step, the damping force of the damper may be controlled to the step selected by the driver, thereby achieving driver satisfaction and reducing costs of the vehicle.

Furthermore, according to the embodiments of the present invention, when the event signal is received from the driver convenience device 15 installed in the vehicle, the step of the multistep switch may be changed such that the damping force of the damper is adjusted to be hard, and after a certain time has elapsed, the step of the multistep switch may be automatically changed to the step selected by the driver, thereby optimizing handling performance and ride comfort of the driver.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 10: multistep switch | 15: driver convenience device |
| 17: interface unit | 20: electronic control unit |
| 21: reception unit | 22: determination unit |
| 23: step change unit | 24: damping force control unit |
| 30: solenoid valve | |

What is claimed is:

1. An electronic control suspension apparatus for controlling a damping force of a damper installed at each of a front wheel and a rear wheel, the electronic control suspension apparatus comprising:
   a multistep switch disposed in a vehicle operable by a driver and configured to change the damping force of each damper in a multistep manner of a plurality of steps; and
   an electronic control unit configured to control the damping force of each damper only based on a current amount that corresponds to a step selected by the multistep switch, the current amount to be applied to a solenoid valve being preset for each step of the multistep switch,
   wherein the electronic control unit stores a step of the multistep switch which is selected by the driver,
   when an event signal is received from a driver convenience device installed in the vehicle, the electronic control unit changes the step of the multistep switch selected by the driver to adjust the damping force of each damper according to the event signal, and
   when a certain time has elapsed after the change of the step of the multistep switch according to the event signal, the electronic control unit sequentially changes the step of the multistep switch back to the step selected by the driver.

2. The electronic control suspension apparatus according to claim 1, wherein
   plurality of steps include a step of prioritizing driving stability and a step of prioritizing ride comfort, and
   the step of prioritizing ride comfort is subdivided into at least two sub-steps.

3. The electronic control suspension apparatus according to claim 2, wherein, when the event signal is received, the electronic control unit controls the damping force of each damper by changing the step of the multistep switch to the step of prioritizing driving stability and applying a current amount corresponding to the step of prioritizing driving stability to the solenoid valve.

4. The electronic control suspension apparatus according to claim 3, wherein
when the certain time has elapsed after the change of the step of the multistep switch to the step of prioritizing driving stability, the electronic control unit changes the step of prioritizing driving stability to the step selected by the driver.

5. The electronic control suspension apparatus according to claim 1, further comprising an interface unit configured to receive vehicle behavior information including information about at least one of a steering angle, a vehicle speed, a brake pedal pressure, and an acceleration pedal, and transmit the received vehicle behavior information to the electronic control unit,
wherein the electronic control unit compares the vehicle behavior information received by the interface unit with preset reference behavior information and changes the step of the multistep switch based on the comparison result.

6. The electronic control suspension apparatus according to claim 1, wherein
the driver convenience device comprises a device installed in the vehicle for driving stability of the vehicle and driving convenience of the driver.

7. The electronic control suspension apparatus according to claim 6, wherein
the driver convenience device comprises at least one selected from a traction control system (TCS), a vehicle dynamic control (VDC), an autonomous emergency braking (AEB), a lane keeping system (LKS), an adaptive cruise control (ACC), a tire pressure monitoring system (TPMS), a motor-driven power steering (MDPS), a blind spot detection (BSD), a traffic jam assist (TJA), and a lane change assistant system (LCA).

8. The electronic control suspension apparatus according to claim 1, wherein
when a fail signal is received from a driver convenience device, the electronic control unit changes the step of the multistep switch such that the damping force of each damper is adjusted.

9. A damping force controlling method of an electronic control suspension apparatus for controlling a damping force of a damper installed at each of a front wheel and a rear wheel, the damping force controlling method comprising:
receiving a step selected by a user from a multistep switch disposed in a vehicle;
storing the step selected from the multistep switch; and
controlling the damping force of each damper based only on a current amount that corresponds to the step of the multistep switch by referring to a storage unit that stores a current amount to be applied to a solenoid valve for each step of the multistep switch,
wherein, when an event signal is received from a driver convenience device installed in the vehicle, the controlling of the damping force comprises changing the step of the multistep switch from the received step to a step of prioritizing steering stability such that the damping force of each damper is adjusted, and
when a certain time has elapsed after changing the step of the multistep switch to the step of prioritizing driving stability, the controlling of the damping force comprises sequentially changing the step of the multistep switch from the step of prioritizing driving stability to the step of the multistep switch which is stored in the storing of the step.

10. The damping force controlling method according to claim 9, wherein
the receiving of the step comprises further receiving the event signal from the driver convenience device installed in the vehicle or further receiving vehicle behavior information including information about at least one of a steering angle, a vehicle speed, a brake pedal pressure, and an acceleration pedal.

11. The damping force controlling method according to claim 9, wherein
the controlling of the damping force comprises:
determining whether the certain time has elapsed after changing the step of the multistep switch; and
when it is determined that the certain time has elapsed, changing the step of prioritizing driving stability to the step of the multistep switch which is stored in the storing of the step.

12. The damping force controlling method according to claim 9, wherein
when a fail signal is received from the driver convenience device, the controlling of the damping force comprises changing the step of the multistep switch such that the damping force of each damper is adjusted.

* * * * *